United States Patent
Bodasinski et al.

(10) Patent No.: US 9,216,371 B2
(45) Date of Patent: Dec. 22, 2015

(54) COMPOSITE FILTERING STRUCTURES WITH MAT OF PACKED MELT BLOWN MICRO- AND NANO-FIBRES HAVING NANO-PROTRUSIONS

(75) Inventors: Jacek Bodasinski, Warsaw (PL); Witalis Ruminski, Warsaw (PL); Pawel Kmuk, Zabki (PL); Jan Gradon, Warsaw (PL)

(73) Assignee: Amazon Filters Spółka z Ograniczoną Odpowiedzialnością, Warszawa-Wesoła (PL)

( * ) Notice: Subject to any disclaimer, the term of this patent is extended or adjusted under 35 U.S.C. 154(b) by 36 days.

(21) Appl. No.: 13/980,264

(22) PCT Filed: Jan. 18, 2011

(86) PCT No.: PCT/PL2011/000006
§ 371 (c)(1),
(2), (4) Date: Jul. 17, 2013

(87) PCT Pub. No.: WO2012/099480
PCT Pub. Date: Jul. 26, 2012

(65) Prior Publication Data
US 2013/0298513 A1 Nov. 14, 2013

(51) Int. Cl.
*B01D 39/00* (2006.01)
*B01D 39/16* (2006.01)

(52) U.S. Cl.
CPC ...... *B01D 39/1623* (2013.01); *B01D 2239/025* (2013.01); *B01D 2239/0622* (2013.01); *B01D 2239/10* (2013.01); *B01D 2239/1208* (2013.01)

(58) Field of Classification Search
CPC .......... B01D 39/1623; B01D 39/1208; B01D 2239/10; B01D 2239/1233
USPC .............. 55/527, 520–521, 523–524, DIG. 5; 96/54; 216/7, 465
See application file for complete search history.

(56) References Cited

U.S. PATENT DOCUMENTS 3,755,527 A 8/1973 Keller et al.
3,801,400 A 4/1974 Vogt et al.
(Continued)

FOREIGN PATENT DOCUMENTS

DE 2314287 A1 10/1973
PL 388235 A1 12/2009
(Continued)

*Primary Examiner* — Robert Clemente
*Assistant Examiner* — Karla Hawkins
(74) *Attorney, Agent, or Firm* — Fitzpatrick, Cella, Harper & Scinto

(57) ABSTRACT

Composite filtering structures comprising nanofibers spatially distributed between microfibers, wherein on the nanofibers and on the microfibers a palisade of protrusions of nanometric sizes in the form of nano-protrusions is produced, which palisade comprises nano-protrusions oriented with respect to the fiber surface at an angle ranging from about 70° to about 120°. A method of obtaining such composite filtering structures by a method that includes feeding a thermoplastic material from an extruder to at least one fiber formation die, stretching formed fibers coming out from the die, which fibers being still in a molten phase, to smaller sizes by a stream of hot air flowing tangentially to the fibers, collecting the fibers after their solidification and thus forming a mat of packed fibers providing a filtering structure, and subjecting the filtering structure to chemical etching.

19 Claims, 3 Drawing Sheets

(56) References Cited

U.S. PATENT DOCUMENTS

| | | |
|---|---|---|
| 3,904,798 A | 9/1975 | Vogt et al. |
| 3,978,185 A | 8/1976 | Buntin et al. |
| 7,052,532 B1 * | 5/2006 | Liu et al. .................. 96/154 |
| 8,349,232 B2 | 1/2013 | Pourdeyhimi et al. |
| 2007/0102372 A1 | 5/2007 | Ferrer et al. |
| 2009/0294733 A1 | 12/2009 | Branham et al. |
| 2010/0107578 A1 | 5/2010 | Behrendt et al. |
| 2012/0189728 A1 * | 7/2012 | Rolland et al. ................ 425/335 |
| 2013/0165007 A1 | 6/2013 | Pourdeyhimi et al. |

FOREIGN PATENT DOCUMENTS

| | | |
|---|---|---|
| WO | 2007/112443 A2 | 10/2007 |
| WO | 2009/144647 A2 | 12/2009 |

\* cited by examiner

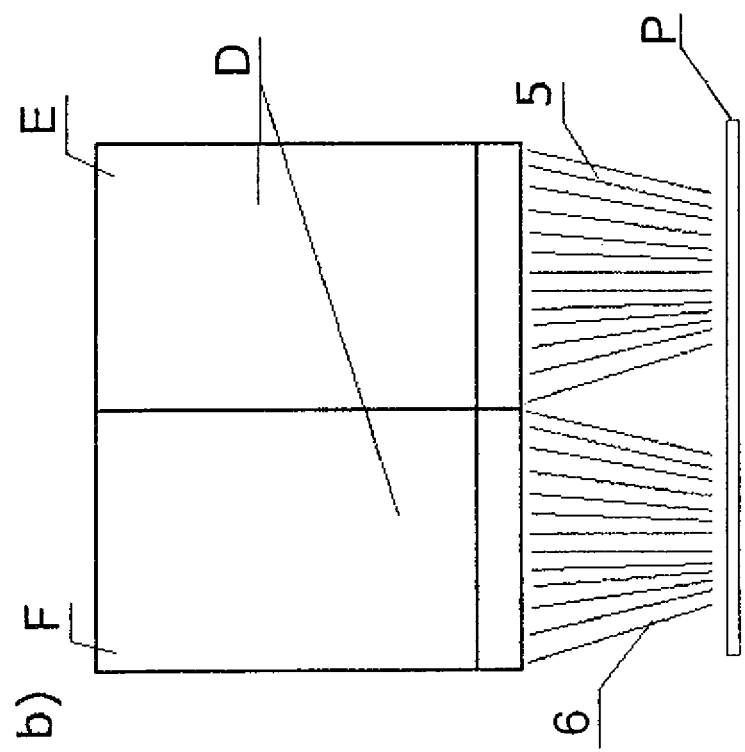
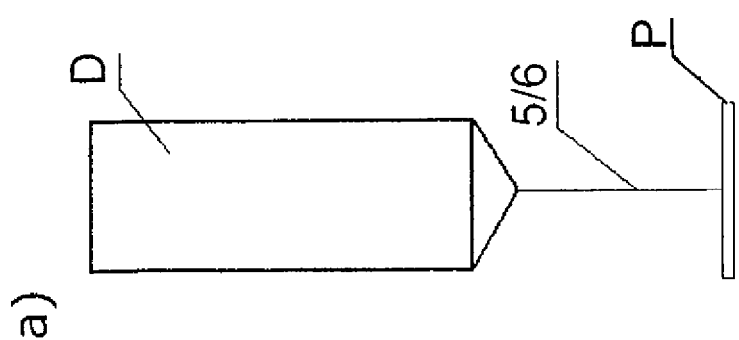
Fig. 2a
Fig. 2b

COMPOSITE FILTERING STRUCTURES WITH MAT OF PACKED MELT BLOWN MICRO- AND NANO-FIBRES HAVING NANO-PROTRUSIONS

An object of the present invention relates to composite filtering structures and a method for obtaining composite filtering structures, designed for filtration of liquid aerosols in the form of two-phase systems, in which the dispersed phase is constituted of droplets of a liquid.

Developments of new technologies, mainly in the field of manufacturing of nanomaterials, as well as increasing requirements for ambient air and water quality, and also for the degree of purification of other substances, cause the need to develop highly efficient methods for cleaning of process fluids and an environment.

In most cases a depth filtration is the last step in such purification process in which solid-phase particles or liquid droplets of nanometric size are removed from a fluid stream. A depth filter designed for filtration of gaseous or liquid suspensions can be characterized by three basic parameters, namely: filtration efficiency, resistance of a fluid flow through a filter and a dust capacity of a filter defining its working time.

Efficiency requirements are determined by the purpose for which particular filter is used, a flow resistance determines energy expenditure for pumping a filtered medium through a filter and a dust capacity indicates frequency of filter replacement and the associated additional costs.

High-performance depth filters are made mostly of non-woven materials obtained by various techniques. Basic features of such filters are determined by a fibre diameter and a porosity of a non-woven fabric. A quality of a filter depends on properly designed structure, defined by the spatial distribution of fibres in the filter volume and local changes of porosity. According to general theory of filtration, a higher efficiency of capturing of particles on the filter fibre is when the fibre diameters are smaller. On the other hand, smaller fibre diameters in a filter volume cause higher flow resistance resulting from surface development and a growth of the fibres curvature and resulting from this growth easier separation of the fluid stream from the surface and conversion to a turbulent flow phase.

Manufacturing of a filtering structure of a predetermined, given morphology requires employing of appropriate fibre-manufacture techniques, which can ensure possibility of obtaining fibres arrangement in an appropriate spatial configuration and which can ensure possibility of changing the fibre diameter in a proper sequence along the flow path of the filtered medium.

The most promising technique for creating programmable structures of depth filters is blowing technique of a molten polymer i.e. melt-blown polymer formation technique. This technique has been disclosed in many patent publications, and its principle is known from U.S. Pat. No. 3,755,527 and U.S. Pat. No. 3,978,185, according to which a thermoplastic polymer material is fed from an extruder to a fibre formation die, in which the formed fibres being still in the molten phase are stretched to a smaller diameter by a stream of hot air flowing tangentially to the fibres. Then, after solidification, the fibres are collected on a receiver to form a mat of packed fibres. The way of reception and packing of fibres determines the characteristics of obtained fibrous structure, which can be used as a filter. One method is to receive fibres on a rotating roller, which is known from German Patent No. DE 2314287.

Single- or multiple layer filter structures comprise micrometer-sized fibres (micro-fibres), that ensure an efficient filtration of particles having diameters greater than one micrometer.

From publication of Polish patent application No P.388235 composite filter structures are known, as well as a method of their manufacture. A disclosed by this patent filter structure is a composite structure comprising nano-sized fibres (nanofibres) spatially distributed among fibres having micrometric sizes. Preferably, in the disclosed filtering structures nanometric fibres have diameters ranging of from 100 to 400 nanometers, and microfibres have diameter sizes ranging from 5 to 30 microns, arranged so that the nanometric fibres i.e. nanofibres of larger diameters are placed between the micrometer-sized fibres i.e. microfibres of larger diameters, whereas nanometric sized fibres i.e. nanofibres of smaller diameters are distributed among micrometric sized fibres i.e. micro-fibres of smaller diameters.

Mixtures of nanometric and micrometric fibres, i.e. nanofibers and microfibers of larger diameters are arranged in an outer part of a composite structure of the filter, and mixtures of nanofibers and microfibers of smaller diameter are located in an inner part of a composite structure of the filter, while looking in a filtered medium flow direction, and in spatial extension of the formed filter nanofibers are contained evenly distributed among microfibers, wherein said nanofibers occupy from about 20% to 50% by volume with respect to a total structure volume and they have an average porosity of a filter higher than 70%. It is also convenient in said structure if nanofibers arranged among microfibers are the attractors to the deposition of nanometric-sized particles, and wherein the presence of microfibers in said structure causes more even-up flow of filtered fluid and results in decreasing flow resistance of a filtered fluid flow by said filter in comparison to such structures that comprise layered microfibers or structures in which a layer of nanofibers is applied to the layered arrangement of microfibers.

The method for manufacturing composite filtering structures by a melt-blown method is disclosed in publication of Polish patent application No P.388235, in which a filtering structure is produced in a multi-die system comprising at least one die for producing nano-fibres and at least one or more dies for producing micro-fibres, which are oriented with respect to the main axis of the die for producing nano-fibres at an angle ranging from about 0° to 15° towards or away from the die for producing nano-fibres. In the method according to this disclosure, preferably, a filtering structure is produced in a multi-die system comprising one die for producing nano-fibres and adjacent two dies for producing micro-fibres. It is also convenient in this method that the fibres of both types of dies are collected on a fibre receiving plane moving in relation to the heads in the X-Y plane with variable linear speeds, imparting to the non-woven fabric a suitable degree of mixing of nano- and microfibres, or if nanofibres and microfibres are mixed at a cylindrical receiver moving in relation to the dies by rotational and reciprocating motions with variable speeds in both movements. Nanofibres and microfibres can be produced by a single die in a sequential manner by changing operating parameters and they are collected on an receiver, forming a multi-layered lamellar structure of nano-fibres and microfibres. In another way nanofibres and microfibers can be produced in the integrated die comprising parts for producing of nano- and microfibres that are connected one another in series, wherein the die for producing of nanofibres is made of electrically non-conducting ceramic material and have arranged inside the die an electrode, preferably a needle electrode, coupled with high-voltage power supply and so that a potential difference is generated between the die and the receiver for stretching the fibre to the nanometric sizes i.e. to nanofibres. A stream of nanofibres is passed through an area of strong cooling of fibre stream to cause a controlled crystallization and fraction of amorphous and crystalline phases of a polymer having different values of a specific volume, which difference causing additional fibrilization of originally manufactured fibres. Further preferably in the method according to this disclosure composite structures of nanofibres and microfibres mixture produced by a blowing technique of molten polymer and streams of in such a way produced fibres are simultaneously applied to a receiver surface.

In composite filtrating structures employed in filtration of liquid aerosols, i.e. of two-phase systems, in which a disperse phase is composed of droplets of liquid, it is necessary to modify a surface of fibres such filtrating structure is made of. Improvement in efficiency of a filter by eliminating droplets of the liquid from a gas phase lies in providing effective drainage of the filter. Namely, droplets captured on a fibre of a filtering structure should be rapidly coalesced and quickly flowed off said fibre surface. The said effect can be achieved by lowering an affinity of a liquid forming droplets to a fibre forming material. Instead of changing a chemical affinity associated with physic-chemical properties of a fibre forming material, a low adhesiveness of droplets of a liquid regardless of its chemical composition can be achieved by an effect of physical interaction of a droplet with a surface of a filtering material.

A composite filtering structure according to the present invention is provided with low surface affinity of a liquid to a fibre by means of formation on the fibres of the filtering composite containing nanometric-size fibres in the form of nanofibers spatially distributed among fibres of micrometer-size in the form of microfibers of a palisade of protrusions in the form of nano-protrusions, protruding away from each fibre surface and oriented with respect to the said fibre surface at an angle ranging from about 70° to about 120°, and preferably oriented at an angle of about 80° to about 100°, and particularly preferably perpendicular to the surface of the fibre. For obtaining the desired effect of low adhesiveness, preferably, nano-protrusions have a height of 30-50 nm, a diameter of 10-20 nm and a distance between adjacent nano-protrusions ranging between 2-5 diameters i.e. preferably is about 2-5 times greater than their diameter.

A surface of a liquid droplet settling on the said modified fibre is strongly deformed in an area between nano-protrusions. A high local curvatures of the droplet surface cause local pressure drops which push out the droplet above the modified fibre surface. The droplets which are pushed out in such a manner aggregate and easily drip, flowing down along the fibre into a tank for receiving the droplets of the liquid which are filtered off on the fibres.

A method of obtaining a composite filtering structures is provided according to the present invention in which the composite filtering structures are obtained by a melt-blown method in the fibre formation process of thermoplastic polymers in which a thermoplastic material is delivered from an extruder to a fibre formation die, in which fibres are formed, wherein formed fibres being still in a molten phase are stretched to smaller diameters by means of a stream of hot air flowing tangentially to the fibres. In a next step, after solidification of the fibres, they are collected on a receiving plane/surface P of a flat receiver of fibres and/or on a rotating shaft to form a mat of packed fibres forming a filtering structure, wherein the filtering composite structure is produced in the multi-die system comprising at least one die for producing nanofibers, and at least one die for producing microfibers or alternatively nanofibers and microfibers are produced in an integrated die. The thus obtained fibrous composite containing nanofibers arranged spatially among microfibers are subjected to chemical etching by immersion in a concentrated solvent, particularly preferably in concentrated inorganic acid for a period of time depending on a content of the amorphous phase fraction, which time is set in a range from about 5 to 15 minutes, and then the composite is rinsed with water and dried. Preferably in the method as the solvent at least one solvent is used, selected from the group consisting of: concentrated nitric acid, concentrated formic acid, phenol, concentrated hydrochloric acid, concentrated acetic acid, chlorobenzene, chloroform, cresol, 1,2 dichloroethane, and/or methylene chloride, depending on the type of thermoplastic material used for manufacturing fibres, wherein, particularly preferably a concentrated nitric acid is used.

In one embodiment of the method in which polyester fibres are used, a chemical etching is carried out with using concentrated non-organic acid, preferably, concentrated nitric acid by immersion of the composite for up to 10 minutes and then the composite is rinsed with water and dried. During the reaction of chemical etching an amorphous phase of the fibre material is rinsed out from each fibre surface, leaving only a crystalline form of the material remained, and thus giving roughness to the surface by forming a palisade of nano-protrusions (nano-protrusion palisade), wherein preferably the fibres contain about 20% by volume of the amorphous phase of the polymer with respect to the total volume of polymer. The formed obtained nano-protrusions, preferably, have a height of 30-50 nm, a diameter of 10-20 nm and wherein a distance between adjacent nano-protrusions preferably is about 2-5 times greater than their diameter.

In one embodiment of the method for obtaining composite filtering structures according to the present invention a fibre surfaces of the nanometric size i.e. nanofibers and surfaces of fibres of micrometric size i.e. microfibers during manufacture process of fibres employing said method of blowing a molten polymer is modified to form on fibre surfaces a palisade of nano-protrusions by means of surface cracks of polymer caused by excess of electrical charge introduced into said polymer during its fibrilisation, that electrical charge excess is forced by an counter electrode positioned under the fibre formation die and causes forming of nano-protrusions oriented at an angle in the range of 70 to 120° in relation to a fibre surface, and more preferably perpendicularly or approximately perpendicularly to a fibre surface. The method according to the present invention lies in the fact that the composite filtering structures are obtained by melt-blown method in the fibre formation process of thermoplastic polymers in which the thermoplastic material is delivered from the extruder to the fibre formation die, coming out from said die formed fibres which are still in a molten phase are stretched to smaller diameters by a stream of hot air flowing tangentially to a fibre formed. Afterwards said formed fibres, after their solidification, are collected on a surface P for receiving fibres in a flat receiver or on a rotating shaft to form a mat of packed fibres being a filtering structure. Such filtering structure can be produced in a multi-die system comprising at least one die for producing nanofibers, and at least one die for producing microfibers or the nanofibers and the microfibers can be produced in the integrated die, wherein the needle electrode is mounted inside each of said dies used. Under each fibre formation die, in which the needle electrode is mounted, counter electrodes are arranged parallel to said fibre stream with the opposing potential value i.e. having the same absolute value but of the opposite sign to the sign of the needle electrode potential. Preferably, a grounded receiver is used as a counter electrode.

BRIEF DESCRIPTION OF THE DRAWINGS

The object of the present invention is further described in details and explained below on the basis of embodiments and attached drawings as follows:

FIG. 2a shows in a side view, schematically, an integrated die for manufacturing microfibers and nanofibers;

FIG. 2b shows in the front view, schematically, the integrated die with streams of micro-fibres and nanofibers.

Figure 1:
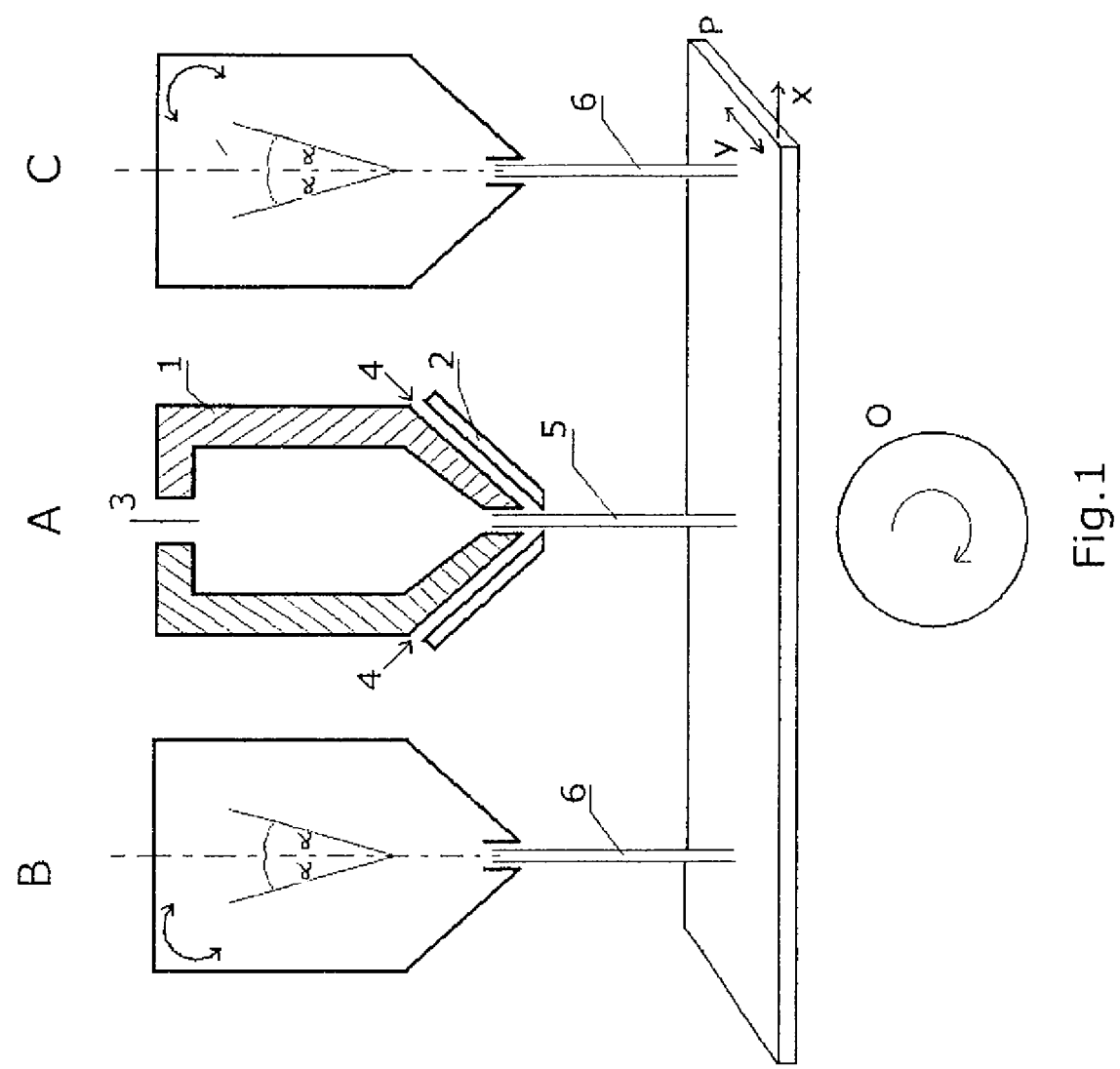
FIG. 1 shows schematically, partially in section, the system of a fibre formation die and a receiver which is applicable in embodiments of the method according to the present invention.

Composite filtering structures in preferred embodiments of the present invention comprise nanometric-sized fibres in the form of nanofibers 5 spatially arranged among micrometric-sized fibres in the form of microfibers 6, wherein on the nanometric-sized fibres (nanofibers) and micrometric-sized fibres (microfibers) a palisade of nanometric-sized protrusions in the form of nano-protrusions is formed which nano-protrusions are oriented with respect to the respective fibre surface at angles ranging from about 70° to about 120°, preferably oriented at angles from about 80° to about 100°. In a particularly preferred embodiment nano-protrusions of said palisades are oriented perpendicularly to the said fibre surface. Fibres in the composite filtering structure in embodiments of the present invention, depending on the destination, may be the fibres of thermoplastic polymer material 3, containing in particular polypropylene, polyethylene, polyester, polyamide, polycarbonate and/or polysulfide or mixtures thereof. In the embodiments the filtering structures comprise nanofibres 5 having diameter sizes ranging from 100 to 400 nm, as well as they comprise microfibers 6 having diameters in the range of 5-30 um, which are arranged so that the nanofibers 5 having larger diameter selected from the range of diameters given above are arranged between the microfibers 6 having larger diameter selected from the said range, whereas nanofibers 5 having smaller diameters selected from the above range are arranged between the microfibers 6 of smaller diameters selected from the said range. In addition, viewing in a direction of a filtered medium flow, a mixture of nanofibers 5 of larger diameters and microfibers 6 of larger diameters is, preferably, arranged in the outer part of such composite filtering structure, whereas a mixture of nanofibers 5 having smaller diameters and microfibers 6 of smaller diameters is arranged in the inner part of a composite filtering structure, and further preferably, nanofibers 5 are distributed evenly in the filtering structure between microfibers 6. It is recommended that the nanofibers would occupy by volume 20%-50% of the total volume of the filtering structure, for example about 30% of the total structure volume. According to one of embodiments the inventive filtering structures have an average porosity of more than 70%. The nano-protrusions formed according to present invention have a height of about 30-50 nm, preferably about 40 nm, a diameter from about 10 to about 20 nm and the distance between adjacent nano-protrusions is from 2 to 5 times greater than their diameters. The nanofibers 5 arranged among the microfibers 6 in the filtering structure according to the invention are attractors to deposition of particles, preferably of nanometric 5 size particles, whereas the addition of microfibers 6 causes an equalization of the medium flow as well as reducing of flow resistance through the filtering structure.

Both the amount and the shapes of produced nano-protrusions at microfibers 6 and nanofibers 5 can be adjusted by regulating parameters of the manufacturing process of fibres from polymer 3, for example, by adjusting the ratio of the crystalline phase to amorphous phase in the formed fibres which ratio depends, inter alia, on the polymer material 3 used and on the cooling speed or cooling rate during fibre formation. The shapes of produced nano-protrusions in the embodiments of present invention can be similar to the cylindrical or tapered ones, in particular, similar to the shape of a slender truncated cone, depending on the parameters of the manufacturing process of nano-protrusions, especially on the speed of the cooling of the microfibers 6 and nanofibers 5 produced in the die. In general, during faster cooling of fibres a higher content of amorphous phase fraction of a polymer 3 is obtained and shapes of the nano-protrusions closer to a conical shape are obtained, while at a slower cooling the shape of the nano-protrusions closer to a cylindrical shape and a higher content of fraction of crystalline phase of polymer 3 in a fibre are obtained. Usually, cooling times ranging from about 0.0075 sec+/−25% to about 0.1 s+/−25% are used, but may be used other values of cooling times depending on specific requirements or needs.

According to the present invention in a method for manufacturing of composite filtering structures a melt-blown method is employed in a fibre formation process of thermoplastic polymers 3, especially above mentioned types in which a thermoplastic material is fed from an extruder to a fibre formation die or dies A, B, C, shown for example in FIG. 1, from which formed fibres that are still in a molten phase are stretched to smaller diameters by a stream of hot air flowing tangentially to the fibres, and then the fibres, after their solidification, are collected on the surface P for receiving fibres on a flat receiver or on a rotating shaft to form a mat of packed fibres forming a filtering structure. Whereas, preferably the filtering structure is produced in a multi-die system (see FIG. 1), comprising at least one die A producing nanofibers 5 and at least one die B, C, producing microfibers 6, or nanofibers 5 and microfibers 6 are produced in an integrated die D shown, for example, in FIG. 2a, 2b, wherein each die is provided inside with a mounted needle electrode S. The resulting composite filtering structure is then subjected to chemical etching by immersion in a concentrate solvent, particularly preferably in concentrated inorganic acid for a period of time ranging from about 5 to 15 minutes, which time depends on content of the fraction of the amorphous phase, and then in subsequent step the composite structure is rinsed with water and dried. In embodiments of the present invention, depending on the type of thermoplastic material used to produce fibres, as a solvent is employed at least one selected from the group, preferably, consisting of: concentrated nitric acid, concentrated formic acid, phenol, concentrated hydrochloric acid, concentrated acetic acid, chlorobenzene, chloroform, cresol, 1,2 dichloroethane and/or methylene chloride, wherein most preferably the concentrated nitric acid is used. Preferably, in the case of fibres made of polyamide a concentrated formic acid, hydrochloric acid, or phenol are used as an etching agent, and in the case of polyester fibres, preferably, concentrated acetic acid, chlorobenzene, chloroform, cresol, 1,2-dichloroethane, concentrated hydrochloric acid, methylene chloride, nitric acid, or phenol are used.

Figure 3:
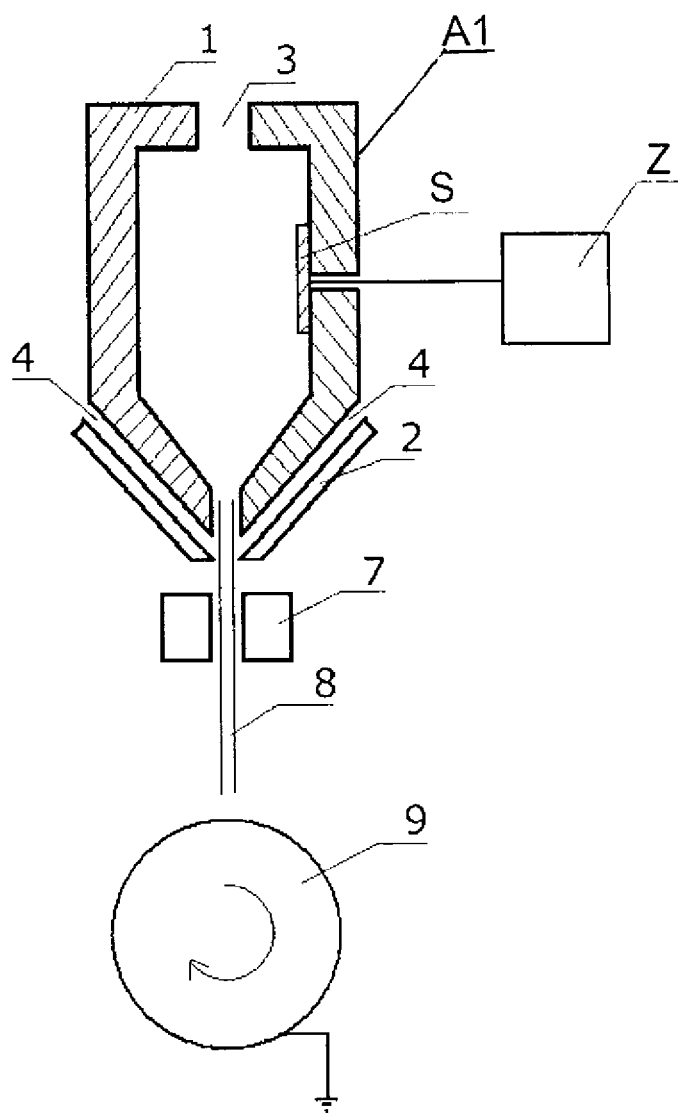
FIG. 3 shows in longitudinal sectional view, schematically, the die connected to the high-voltage electrode and to the fibre cooling element used in an embodiment of the present invention.

In another variation of present invention, the composite structures are manufactured in such a way that the composite filtering structure which is obtained in the fibre formation process of thermoplastic polymers 3 as described above by melt-blown method is subjected to high voltage, so that under each of the heads, parallel to the fibre stream, a counter electrode is placed having an opposed potential i.e. having potential of the same absolute value but with opposite sign to the potential of the needle electrode S located in the die, as shown in FIG. 3, but preferably a grounded receiver (O, 9) is used as a counter electrode. In embodiments of the two embodiments of the invention the filtering structure can be manufactured in multi-die system comprising one die A, A1, D producing nanofibres 5 and the adjacent two dies B, C, producing microfibers 6. The fibres 5, 6 from both types of dies A1, B, C and D are collected at the fibre receiving surface P moving, preferably, in relation to the dies in the X-Y plane with variable linear speeds, giving to the thus formed non-woven material an appropriate degree of mixing of nanofibers 5 and microfibers 6. Alternatively, nanofibers 5 and microfibers 6 are mixed at the cylindrical receiver O or 9 moving relative to the dies A, A1, B, C, by performing rotational and reciprocating motions with variable speeds in both movements. In another embodiment the nanofibres 5 and microfibers 6 can be produced in a single die A, A1 in a sequential manlier by changing the operating parameters and they are collected at the receiver O, 9, forming multi-lamellar structures of the nanofibers 5 and microfibers 6. According to the present invention number of fibre layers can be formed in the filtering structure, for example, seven layers, each of which is composed of number of nanofibers and microfibers layers. Alternatively, the nanofibers 5 and microfibers 6 are produced in an integrated die D comprising die parts E, F connected in series to produce nanofibers 5 and microfibers 6. In further another embodiment, the die A1 is used for producing nanofibers 5, which die is made of non-conducting electrically ceramic material i.e. electrically insulating material, and inside the die A1 a needle electrode S is placed, which is connected to high-voltage power supply Z, whereas between the die A1 and a receiver 9 a potential difference is generated to stretch the fibre 8 to a nanometric size.

A stream of nanofibers 8 can be passed, for example, through a strong cooling zone 7 of a fibre stream, causing controlled crystallization and the fraction of amorphous phase and crystalline phase of a polymer 3 having different values of specific volume and further causing additional fibrilization of originally manufactured fibres. Composites of mixtures of nanofibers 5 and microfibers 6 produced by the blowing technique of molten polymer and the streams of produced fibres are simultaneously applied to the surface of the receiver O or 9.

In another embodiment of the present invention polymer 3 crystallization process and a content of amorphous phase and crystalline phase fractions in the polymer 3 forming fibres can be controlled by introducing into the polymer 3 nucleuses of crystallisation that can be nanometric particles of a solid phase, for example such as particles of titanium dioxide or particles of barium sulphate. Depending on concentration of the said particles different volume content of the amorphous phase fraction and the crystalline phase fraction in the solidified polymer 3 can be obtained. For the process advantage, preferably particles having diameters from 5 to 30 nanometers and with concentration of from about 0.01% to 0.05% by weight are introduced into said polymer.

EXAMPLE 1

A depth filter made of polypropylene has been produced using the technique of blowing a molten polymer. The molten polymer has been fed into a steel fibre formation head at a temperature 270° C., which may, however, in other embodiments be in the range from 250 to 300° C. The pressure in the die was 2 atm. A linear velocity of the polymer in the die channel having a diameter of 0.6 mm has been 20 cm/s. In parallel to the polymer stream an air has been fed at a temperature of 360° C. with a linear velocity of 40 m/s, but it is also possible to use a linear speed of 30 m/s. Under these conditions, fibres with a diameter of 270 nanometers have been obtained. By changing the linear velocity of the air to 10 m/s while maintaining the other process parameters as previous the fibres with a diameter of 15 microns were obtained. Both types of fibres, produced sequentially at intervals of every 20 seconds, were collected on a receiver moving under the die by rotational and reciprocating motion. In this way, a composite filter layer comprising nano- and microfibers with a thickness of 2.5 cm and an average porosity of a filter at a level of 85% has been produced. The resulting sample was immersed for minutes in concentrated nitric acid, and then the sample has been rinsed in water and dried. As a result of reaction with nitric acid an amorphous phase of polypropylene has been washed out from the surface of fibres leaving a crystalline phase only and thus giving roughness to the fibres surface. Observations of an image of the fibres at SEM photos has revealed on the fibre surface the presence of palisade of nano-protrusions having a shape similar to elongated cones. The average diameter of obtained nano-protrusions has been 30 nanometers and the distance between the adjacent protrusions has been 100 nanometers.

EXAMPLE 2

A filtering structure has been produced under the same conditions of pressure, temperature and flows as in the Example 1 described above, except that the head has been made of silicon carbide. A flat electrode with an area of 4×4 cm being provided on its surfaces with needles of a thickness 0.5 mm and a height of 3 mm, has been mounted inside the die. The distances between the needles were about 3 mm. The electrode has been connected to an external source of a constant current of a voltage of 10 kV with a negative emission electrode. A receiver, on which the fibres have been collected, was grounded. The resulting filter structure had the same structure as in Example 1, and on the fibres surfaces due to interactions of electrostatic trapped charges during charging, which are larger than a surface tension of the polymer, a roughness have been produced comprising nano-protrusions having shapes similar to cylindrical shape of a diameter about 10 nm and spaced one another for a distance up to 30 nm.

EXAMPLE 3

The composite filtering structure has been produced in the similar manner as described in case of Example 1 but to the polypropylene that is to be subjected fibre formation process in the fibre formation die 0.04% by weight of particles of titanium dioxide have been introduced, which particles having diameters of about 20 nanometers. Temperature of polymer in the head has been 270° C., an ambient temperature in which the fibres formed have been collected has been 40° C. The formed in such a way fibres have had 60% by weight of the amorphous phase content and 40% by weight of the crystalline phase content in the solidified polymer. Afterwards the process of etching the amorphous phase from the formed fibrous structure has been conducted by means of using concentrated nitric acid and as a result nano-protrusions have been achieved on the fibres surface.

The invention claimed is:

1. A composite filtering structure,
comprising a mat of packed melt-blown fibres, said mat comprising nanofibers spatially distributed between microfibers, said nanofibers being of nanometric sizes and said microfibers being of micrometric sizes;
said nanofibers and said microfibers further comprising a palisade of nano-protrusions of nanometric sizes, wherein
the nano-protrusions are oriented at angles ranging from about 70° to about 120° with respect to fibre surfaces of said nanofibers and said microfibers.

2. The composite filtering structure according to claim 1, wherein the nanofibers have diameters in a range of 100-400 nm and the microfibers have diameters in a range of 5-30 µm,
the nanofibers and the microfibers are arranged such that nanofibers having larger diameters are arranged among microfibers having larger diameters, and nanofibers having smaller diameters are arranged between microfibers having smaller diameters, and
looking in a direction of a filtered medium flow, a mixture of the nanofibers with larger diameters and the microfibres of larger diameters is located in the outer part of the composite filtering structure, and a mixture of the nanofibers having smaller diameters and the microfibers having smaller diameters is located in an inner part of the composite filtering structure.

3. The composite filtering structures according to claim 1, wherein the nanofibers are distributed evenly in the composite filtering structure among the microfibers.

4. The composite filtering structure according to claim 1, wherein the nanofibers occupy 20%-50% of a total volume of the composite filtering structure.

5. The composite filtering structure according to claim 1, wherein the composite filtering structure has an average porosity of more than 70%.

6. The composite filtering structure according to claim 1, wherein the nano-protrusions have a height of 30-50 nm and a diameter of 10-20 nm.

7. The composite filtering structure according to claim 1, wherein the nanofibers arranged between the microfibers are attractors to a deposition of particles, and
the microfibers equalize filtered fluid flow and reduce flow resistance through the composite filtering structure.

8. A method of producing the composite filtering structure according to claim 1, comprising the steps of:
feeding a thermoplastic material from an extruder to at least one fibre formation die to obtain formed fibres;
stretching the formed fibres coming out from the die in a molten phase to smaller sizes by flowing a stream of hot air tangentially to the fibres;
collecting the fibres after solidification at a fibre receiving plane on a flat receiver, or on a rotating shaft to form a mat of packed fibres providing a composite filtering structure;
chemical etching the mat of packed fibres by immersion in concentrated solvent for a period of time ranging from about 5 to 15 minutes depending on a content of an amorphous phase fraction in a polymer forming said packed fibers; and
rinsing the composite filtering structure with water and drying the composite filtering structure, wherein
the composite filtering structure is produced in a multi-die system comprising at least one die for producing nanofibers and at least one die for producing microfibers, or the nanofibers and the microfibers are produced in an integrated die, the dies being optionally provided with a needle electrode mounted inside.

9. The method according to claim 8, wherein the solvent is at least one member selected from the group consisting of concentrated nitric acid, concentrated formic acid, phenol, concentrated hydrochloric acid, concentrated acetic acid, chlorobenzene, chloroform, cresol, 1,2-dichloroethane, and methylene chloride.

10. A method for obtaining a composite filtering structure, according to claim 1, comprising the steps of:
feeding a thermoplastic material from an extruder to at least one fibre formation die to obtain formed fibres;
stretching the formed fibres coming out from the die in a molten phase to smaller sizes by a flowing stream of hot air tangentially to the fibres; and
collecting the fibres after their solidification at a fibre receiving plane on a flat receiver or on a rotating shaft so as to form a mat of packed fibres providing a composite filtering structure, wherein
the composite filtering structure is produced in a multi-die system comprising at least one die for producing nanofibers and at least one die for producing microfibers, or the nanofibers and the microfibers are produced in an integrated die, and
the die being provided with a needle electrode mounted inside, with a counter electrode arranged underneath the die parallel to a fibre stream and being provided with an opposing potential to a potential of the needle electrode.

11. The method according to claim 10, wherein the counter electrode is a grounded receiver.

12. The method according to claim 8, wherein the composite filtering structure is produced in the multi-die system comprising one die producing the nanofibers and two adjacent dies producing the microfibers.

13. The method according to claim 8, wherein the fibres from the multi-die system or the integrated die are collected at the fibre receiving plane moving in relation to the dies in a plane with variable linear speeds, giving to a non-woven material an appropriate degree of mixing of the nanofibers and the microfibers.

14. The method according to claim 8, wherein the nanofibers and the microfibers are mixed at a cylindrical receiver moving in relation to the dies by rotational and reciprocating motions with variable speeds in both movements.

15. The method according to claim 8, wherein the nanofibers and the microfibers are produced in a single die in a sequential manner by changing operating parameters and being collected at a receiver, forming a multi-layered lamellar structure of the nanofibres and the microfibres.

16. The method according to claim 8, wherein the nanofibers and the microfibers are produced in the integrated die comprising die parts connected in series for producing the nanofibers and the microfibers.

17. The method according to claim 8, wherein the die for producing nanofibers comprises an electrically non-conducting ceramic material with said needle electrode being mounted inside the die, wherein
the needle electrode is connected to a high-voltage power supply, and
a potential difference is generated between the die and a receiver to stretch the fibres to nanometric sizes.

18. The method according to claim 8, wherein a stream of nanofibres is passed through a cooling area of a fibre stream, causing a controlled crystallization of a polymer, and an amorphous phase and a crystalline phase fractions of the polymer have different values of specific volume, causing an additional fibrilization of originally manufactured fibres.

19. The method according to claim 8, wherein the composite filtering structure comprising mixtures of the nanofibers and the microfibers are simultaneously applied to a surface of a receiver.

* * * * *